May 9, 1967 A. E. MILLER ET AL 3,318,020
BREATHING MASK LEAK DETECTOR AND TRAINING AID
Filed Oct. 12, 1964 3 Sheets-Sheet 1
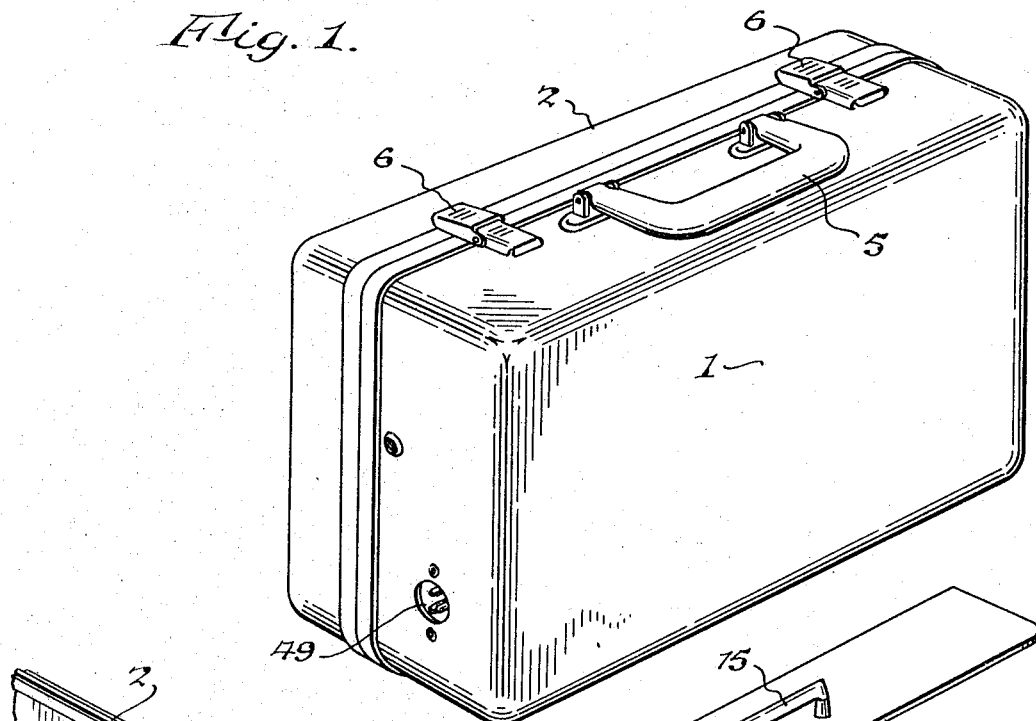
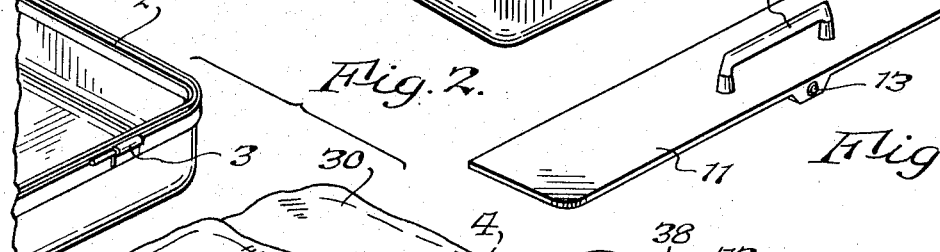
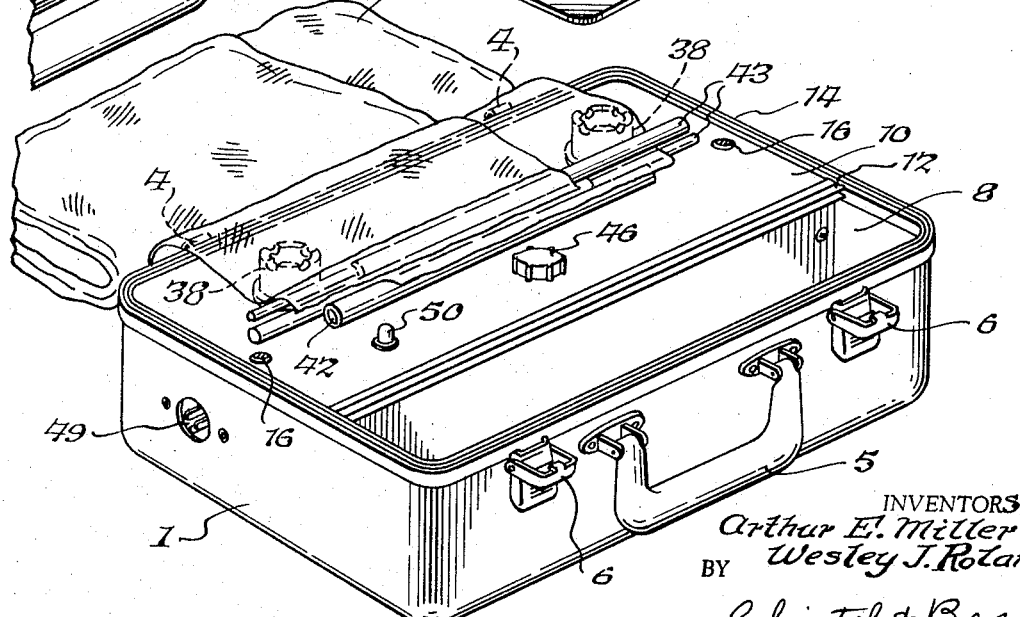
INVENTORS.
Arthur E. Miller
BY Wesley J. Roland
Christel & Bean
ATTORNEYS.

INVENTORS.
Arthur E. Miller
Wesley J. Roland
BY Christel + Bean
ATTORNEYS.

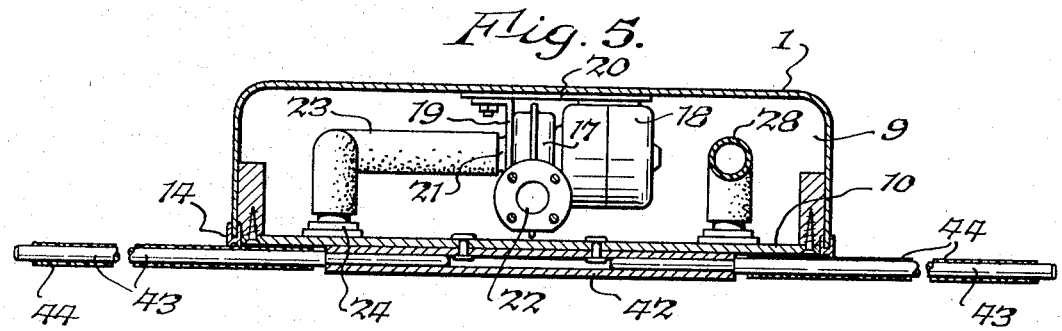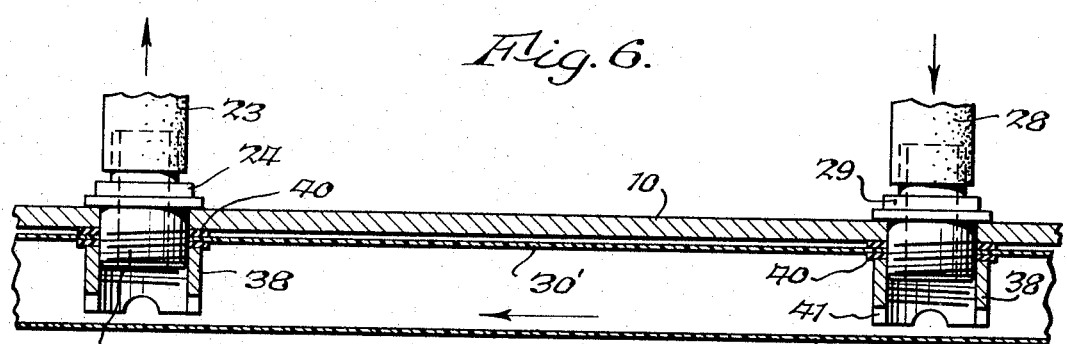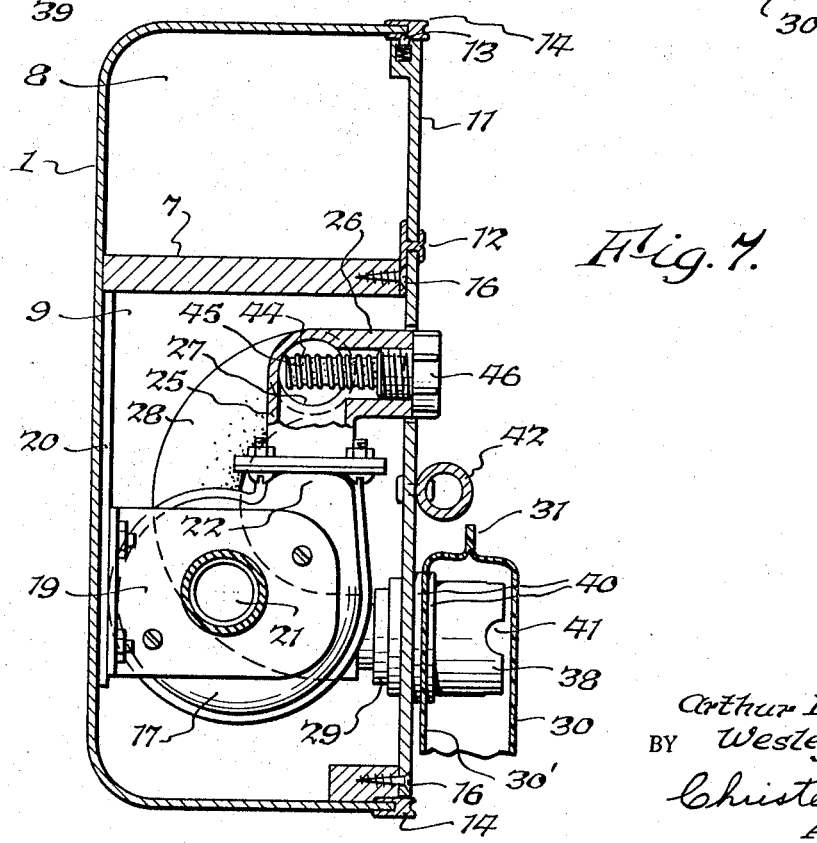

United States Patent Office 3,318,020
Patented May 9, 1967

3,318,020
BREATHING MASK LEAK DETECTOR AND
TRAINING AID
Arthur E. Miller and Wesley J. Roland, Buffalo, N.Y., assignors to Scott Aviation Corporation, Lancaster, N.Y.
Filed Oct. 12, 1964, Ser. No. 403,196
5 Claims. (Cl. 35—8)

This invention relates to a new and useful breathing mask leak detector and training aid.

For many years there has been need for a simple, portable training device to enable users of breathing equipment to properly train their personnel in the use thereof. Confidence in the equipment, or in the user himself, cannot be established by merely explaining the equipment verbally or allowing trainees to use the equipment in an uncontaminated atmosphere. It is one thing to tell a man he will be protected if he does this and that, and another thing entirely if he experiences this under adverse but safe and supervised conditions.

Therefore, a primary object of this invention is to provide a simple, economical portable training aid to help a man gain confidence in his protective breathing equipment, to teach the correct mask donning technique and to prove the importance of care in donning the mask and the serious consequences of improper or careless donning.

Another object of this invention is to provide a simple, economical, portable detector for checking breathing equipment for leaks after maintenance has been performed.

In one aspect thereof, a breathing mask leak detector and training aid constructed in accordance with our invention is characterized by the provision of a portable container, a flexible enclosure of substantially transparent material open at one end, the enclosure being secured adjacent its other end to the container for being suspended therefrom over the upper portion of a human body, and means carried by the container for circulating through the enclosure a gas containing a physiological reaction producing chemical, such as an odor producing chemical or a chemical irritating to the mucous membranes of either the eyes or the respiratory system.

The foregoing and other objects, advantages and characterizing features of a breathing mask leak detector and training aid of our invention will become clearly apparent from the ensuing detailed description of an illustrative embodiment thereof, reference being made to the accompanying drawings depicting the same wherein like reference numerals denote like parts throughout the various views and wherein:

FIG. 1 is a perspective view of a portable breathing mask leak detector and training aid of our invention, shown in closed position;

FIG. 2 is a perspective view thereof in open position, with the top of the case and the accessory compartment cover removed, and with the transparent enclosure partially unfolded, parts being broken away for ease of illustration;

FIG. 3 is a top perspective view of the accessory compartment cover, removed from the bottom of the case;

FIG. 5 is a transverse sectional view thereof, on the same scale as FIGS. 1-3, taken about on line 5—5 of FIG. 4;

FIG. 6 is an enlarged, fragmentary sectional view thereof, taken about on lines 6—6 of FIG. 4; and FIG. 7 is a vertical sectional view thereof, taken about on line 7—7 of FIG. 4.

Figure 4:
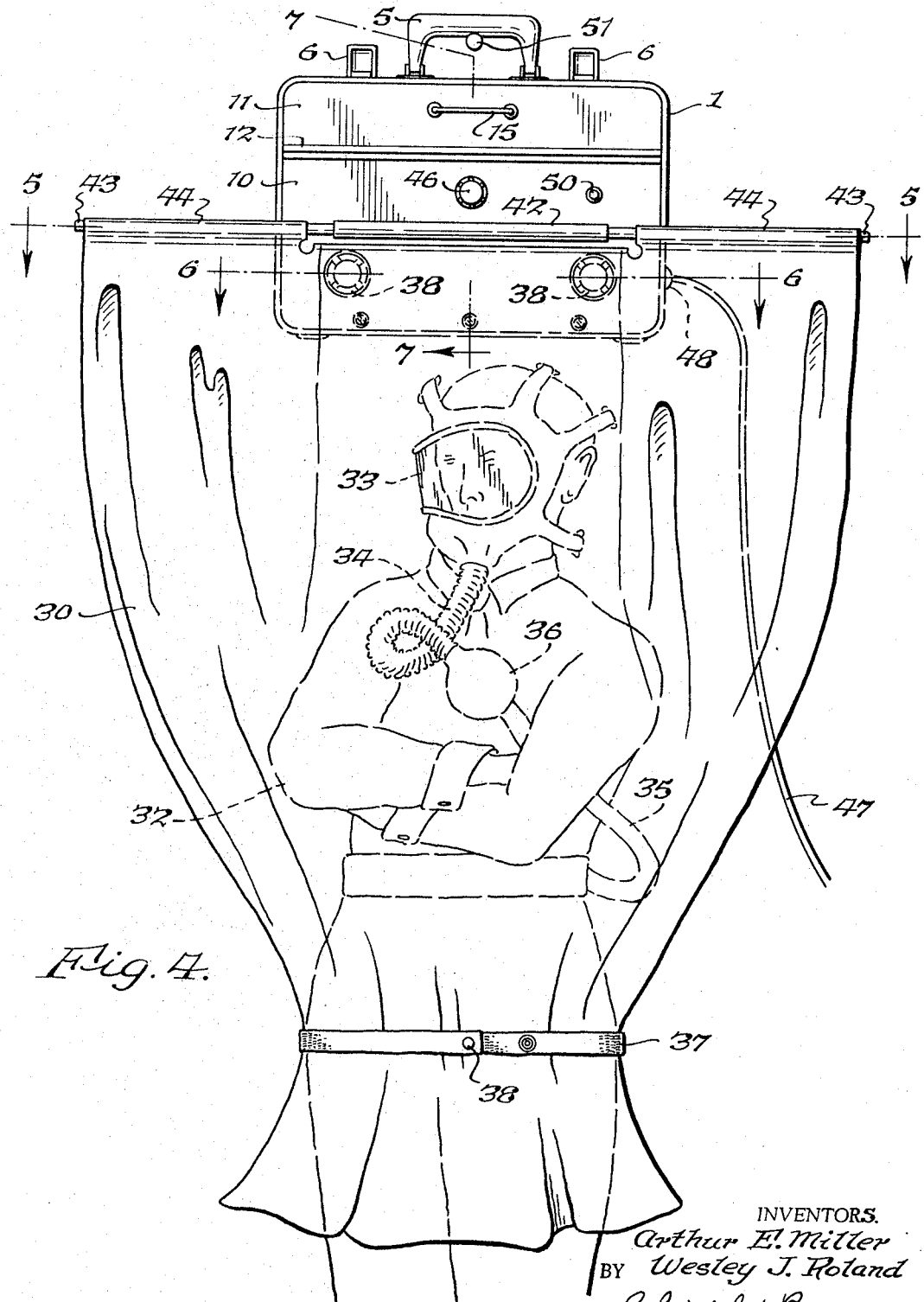
FIG. 4 is a front elevational view, on a reduced scale, showing the breathing mask leak detector and training aid of FIGS. 1-3 as it appears when in use.

Referring now in detail to the illustrative embodiment depicted in the accompanying drawings, there is shown a leak detector and training aid of our invention comprising a carrying case having a bottom 1 and a top 2, the top and bottom members having encircling side and end walls giving each member a recessed, box-like form, as shown. Top member 2 carries hinge parts 3 having a lateral slip fit with hinge parts 4 on the bottom member 1, for detachable hinged assembly thereof. The bottom member 1 has, on the side wall opposite the hinge parts 4, a carrying handle 5 and a pair of latches 6 adapted to engage latch parts, not shown, on the cover 2 for holding the case in closed position as shown in FIG. 1.

The bottom 1 of the case is divided by a wall 7 into an accessory compartment 8 and a blower compartment 9. The blower compartment 9 is closed, by a cover wall 10, and the accessory compartment 8 is closed by a removable cover 11 arranged to slip fit at its lower end into a channel provided by a member 12, the cover carrying a spring back, ball detent 13 engaging behind a top receiving flange 14, to releasably retain cover 11 in position. A handle 15 is provided, for ease in manipulating cover 11 into and out of its accessory compartment enclosing position.

The cover wall 10 for blower compartment 9 is held in position by screws or other such fastenings, as indicated at 16.

An air circulating blower is mounted in the blower compartment 9, comprising a fan 17 and an electric drive motor 18 therefor, the same being mounted on brackets secured to the bottom 1 of the case, as indicated at 19 and 20. Motor 18 and blower 17 are of conventional design, the details of which are known and therefore are not illustrated. Fan 17 has a central inlet 21 and a peripheral outlet 22. A flexible hose 23 connects fan inlet 21 with an inlet coupling 24 secured to the blower compartment cover 10 and projecting therethrough. The fan outlet 22 is secured to one leg 25 of a three-way fitting having a second leg 26 projecting through the blower compartment cover 10 and a third leg 27 connected to one end of a flexible hose 28. The opposite end of hose 28 is connected to an outlet fitting or coupling 29 also mounted on the blower compartment cover 10 and extending therethrough.

An elongated enclosure 30 of a gas impervious, transparent material, such as for example polyethylene having a closed upper end 31 is secured to the bottom 1 of the carrying case, for being suspended therefrom as shown in FIG. 4. Enclosure 30 is in the form of an inverted bag, being open at its lower end for slip fitting over the entire upper portion of the human body. Thus, as clearly shown in FIG. 4, the bag enclosure 30 is adapted to enclose the head and trunk of a person 32 wearing a breathing mask 33 having a flexible hose connection 34, 35 to a container of compressed oxygen, not shown, carried on his back, the conduits 34 and 35 being joined by a regulator 36 of the demand type. An elastic band 37 having snap fasteners 38 adapted for connection at different spaced points along the strap, is provided to gather the lower end of the bag about the hips or legs of the person in the enclosure.

To accomplish the foregoing, with a compact, readily portable carrying case, we provide a bag 30 which is substantially wider than the carrying case 1, 2. The central portion of enclosure 30 is secured to the bottom 1 of the carrying case, adjacent the upper end of the enclosure, by clamping its rear wall 30' against the breathing compartment cover 10, using tubular nuts 38 threaded on the tubular nipples 39 of the couplings 24, 29 projecting through the cover 10. Thus, the enclosure rear wall 30' is apertured, to receive the coupling nipples 39, with sealing gaskets 40 engaging the enclosure wall 30' on opposite sides thereof, around the nipples 39, and clamped against the blower compartment cover by the nut 38.

With this arrangement, there is provided a system for circulating and recirculating gas through the enclosure at its upper end, the circulating system comprising the inlet coupling 24, hose 23, fan inlet 21 and outlet 22, fitting legs 25 and 27, hose 28, outlet coupling 29 and the enclosure itself which places the outlet coupling 29 in communication with the inlet coupling 24, fluid flow being in the direction of the arrows in FIG. 6. The outer ends of the nuts 38 are recessed at spaced points thereof, as indicated at 41, to preclude blocking either the inlet or the outlet by engagement of the front wall of enclosure 30 against the nuts 38.

As previously noted, bag 30 is wider than the carrying case, and it is a feature of our invention that the bag can be suspended at its full width, as shown in FIG. 4, while being foldable upon itself for storage within the carrying case. To this end, we provide a tubular rod holder 42 secured to the breathing compartment cover 10, across the upper end of the enclosure 30. A pair of rods 43 are provided, for slip fit insertion in tubular upper end portions 44 at opposite sides of the enclosure bag 30. Rods 43 project inwardly, beyond the tubular portions 44, having reduced diameter end portions slip fitting into the tubular rod holder 42.

Thus, in use the bag is suspended from the bottom 1 of the case, at its full width, as shown in FIG. 4. When not in use, the rods 43 are withdrawn from the rod holder 42, whereupon the opposite side portions of the enclosure bag 30 are foldable over onto the central portion thereof, as clearly shown in FIG. 2. With the bag thus partially folded, it can be completely folded upon itself, lengthwise, as shown in FIG. 2, for storage on the compartment covers 10, 11, with the top 2 of the case.

The gas circulating system as described above will circulate and recirculate air through the enclosure 30. To enable the trainee 32, or breathing equipment tester, as the case may be, to detect a leak, we introduced into the circulating air a chemical producing a physiological reaction upon the respiratory system, or the eyes in the case of a full face mask. This is accomplished by providing a wick 44 of suitable material, which can be mounted in a spring 45 carried by a plug 46, whereby the wick can be inserted through the leg 26 of the three way fitting, into the communicating passages through legs 25 and 27, the plug 46 being threadedly engaged in the leg 26, for closing it off from the ambient atmosphere. The wick 44 is adapted to carry either an odor producing chemical, such as ethyl formate, or an irritant chemical, such as ethyl chloroformate diluted with trichloroethylene. In either case, there is introduced into the circulating gas stream, a chemical the presence of which will be detected by the person 32 in the enclosure, if his mask or other parts of his breathing equipment develop a leak. If they do not, he will not detect the presence of such a chemical. Of course, any suitable vaporific substance can be used.

The accessory compartment 8 is adapted to contain the chemical solutions, in appropriate bottles or other containers, not shown. Also, the power cord 47 can be stored in the accessory compartment 8, along with the elastic strap 37 and any other accessories which may be used with the leak detector and training aid of our invention. The power cord 47 has a plug 48 at one end, adapted for insertion in a receptacle 49, to energize the motor 18. The wiring to the motor is conventional, and therefore not shown. A light 50 can be arranged on the blower compartment cover 10, for illumination whenever the blower motor 18 is "on."

To prepare for testing, lay the case on its side, release the cover latches 6 and open the case. Slide the top cover 2 to the right to part the hinges, and remove the top. This exposes the plastic enclosure 30 which was stored directly beneath the top cover. Unfold the plastic bag 30 over the hinge side of the case, to its full length and width. As it is unfolded, remove the two extension rods 43 which are stored in the folds. Insert a rod 43 into the top of the plastic enclosure on each side of the rod holder 42 and then insert the rod ends into the holder. This supports the enclosure for its full width at the top.

Lift the accessory compartment cover 11 from the case and remove the elastic band 37, electric cord 47, and bottles containing the chemicals. Replace the compartment cover. Unscrew the wick cap 46 from the case and dip the wick ¼ inch into the chemical formula once or twice and immediately replace wick cap. Screw in finger tight.

Plug one end of electric cord 47 into receptacle 49 on side of case and hang the case by the carrying handle 5 to an overhead hook 51. If the case is hung near an electrical outlet (115 volts, 60 cycles), an extension cord will not be necessary. The recommended height for hanging the case is 6½ feet from the floor to the bottom of the case.

To make a test the trainee 32 with protective breathing equipment 34–36 in place and mask 33 donned, enters the plastic enclosure 30 from the open bottom and assumes an upright, standing position. The instructor secures the bottom end of enclosure 30 around the trainee by means of elastic band 37. When all is in readiness, the free end of the electric cord 47 is plugged into an A.C. receptacle, not shown. This energizes fan motor 18 in the case, blowing a stream of air over wick 44, which air enters the plastic enclosure 30 through the outlet opening 29. This mixture of air and chemical circulates around the trainee and is drawn into the fan stream through the inlet opening 24. If there is a leak in the mask equipment, or if the mask has been improperly donned, the odor or the irritant, depending on which chemical is used, will be detected by the trainee in less than a minute.

When the test is completed, the plug is withdrawn from the A.C. receptacle, the elastic band removed, and the trainee makes his exit. Before the next man enters the enclosure 30 it should be purged. This is quickly accomplished by removing the wick-cap 46 and inserting the plug into the A.C. receptacle.

The leak detector and training aid of our invention may also be used in a small room without using the plastic enclosure 30. Simply remove nuts 38 to remove the enclosure completely and proceed as outlined above. This enables a group to be trained at one time. However, in this case, the instructor must also wear breathing equipment and preferably special equipment for communication, whereby this procedure, while available, is not as desirable.

The training aid of our invention, when used with the enclosure 30, permits the instructor to give each trainee individual attention. This is much better than group instruction and group exposure to a smoke filled area. The trainee is visible to the instructor at all times, whereby the instructor can observe the trainee's reaction to the irritant or odor producing chemicals in the transparent enclosure. Because the instructor does not have to wear protective breathing equipment, his instructions and gestures can be more clearly understood by the trainee. This speeds up the training procedure so that a large group can be instructed in the best mask-donning technique and their proficiency tested in the shortest possible time.

Complete safety is provided by our invention during the testing phase of the training program. The odor-producing chemical is harmless. The irritant-producing chemical, also harmless, is mild yet penetrating. However, if the trainee develops groundless fright or panics, he can be out of the enclosure in a few seconds.

The training aid of our invention can be set up indoors or outdoors, ready for testing in minutes. It is completely self-contained. No extras are required. Chemicals are supplied for two types of tests—the odor test and the irritant test. Both are harmless but are quickly detected by the man in the mask if the smallest leak is present.

After completion of a test, the air in the enclosure can be quickly purged, ready for the next man. When not in use, the entire equipment is compactly stored in the small compartmental case, equipped with carrying handle.

The device of our invention can be used to test self-contained, hoseline, or cannister masks, and any inward leakage of air to the facepiece will be quickly detected.

Accordingly, it is seen that our invention fully accomplishes its intended objects. While we have disclosed and described in detail but one embodiment, it will be understood that this has been done by way of illustration only.

Having fully disclosed and completely described our invention, and its mode of operation, what we claim as new is:

1. A breathing mask leak detector and training aid comprising a carrying case including a closure member therefor, a foldable flexible enclosure of substantially transparent material open at one end, means securing said enclosure adjacent its other end to said case for being suspended therefrom over the upper portion of a human body, and means carried by said container for introducing and circulating through said enclosure a gas containing a physiological reaction producing chemical, said enclosure being foldable into said case and said closure member confining the folded enclosure within said case.

2. A breathing mask leak detector and training aid comprising a carrying case, a flexible enclosure of transparent material substantially closed at one end and open at the other, said enclosure being secured at said one end to said case and being foldable on itself for storing in said case, and a gas circulating system carried by said case including a circulating fan, ducting to and from said fan, said ducting having an inlet into said one end of said enclosure and an outlet therefrom, and means for suspending said case with said enclosure unfolded and hanging downwardly to enclose the upper portion of a person wearing a breathing mask, and means for introducing into said ducting a chemical producing a physiological reaction upon leaking past a mask being worn by a person in said enclosure.

3. A breathing mask leak detector and training aid comprising a carrying case including a closure member therefor, an elongated foldable flexible enclosure of substantially transparent material having a central portion secured adjacent one end thereof to said container to depend therefrom over the upper part of the human body, said enclosure being wider than said case, the opposite side portions of said enclosure being foldable onto said central portion thereof and the thus partially folded enclosure being foldable lengthwise upon itself for storing in said case, said closure member confining the entirely folded enclosure within said case, means suspending said enclosure from said case when unfolded to its full width including a tubular rod holder carried by said case and tubular rods engaging said side portions of said enclosure at said one end thereof and releasably engagable with said rod holder to extend beyond said case when supporting said enclosure and for storage within said case, and means carried by said case for circulating a gas through said enclosure.

4. A breathing mask leak detector and training aid as set forth in claim 3, wherein said last-named means include tubular passageway between said case and said central portion of said enclosure adjacent said one end thereof.

5. A breathing mask leak detector and training aid comprising a carrying case including a closure member therefor, a foldable flexible enclosure of substantially transparent material carried by said case and adapted to enclose the upper portion of the human body, means carried by said case for recirculating gas through said enclosure, said circulating means including a fan and ductwork interconnecting said fan and said enclosure, and means including a wick inserted in said ductwork for introducing a physiological reaction producing chemical into the gas being circulated through said enclosure, said enclosure being foldable into said case and said closure member confining the folded enclosure within said case.

References Cited by the Examiner
UNITED STATES PATENTS

| 1,669,971 | 5/1928 | Collins | 128—191 |
| 1,971,408 | 8/1934 | Heidbrink et al. | 128—191 |
| 2,600,501 | 6/1952 | Higgs | 128—191 |
| 2,702,546 | 2/1955 | Gilroy et al. | 128—191 |
| 3,050,058 | 4/1962 | Andrews | 128—191 |
| 3,090,382 | 5/1963 | Fegan et al. | 128—191 |

EUGENE R. CAPOZIO, *Primary Examiner.*

S. M. BENDER, W. NIELSEN, *Assistant Examiners.*